(12) United States Patent
Bordin et al.

(10) Patent No.: US 12,518,250 B2
(45) Date of Patent: Jan. 6, 2026

(54) SYSTEMS AND METHODS FOR DYNAMIC KNOWLEDGE DRIVEN PROCESSES

(71) Applicant: OYSTER HR, Inc., Wilmington, DE (US)

(72) Inventors: Matteo Bordin, Wilmington, DE (US); Olga Peryanovich, Wilmington, DE (US); Jonas Suarez, Wilmington, DE (US); Taisa Echer Cervo Daneluz, Wilmington, DE (US); Irene Tremblay, Wilmington, DE (US); Kevin Mcfaul, Wilmington, DE (US); Yury Makarevich, Wilmington, DE (US); André Bastos, Wilmington, DE (US); Eugene Haisenka, Wilmington, DE (US); Aliaksandra Rabushka, Wilmington, DE (US); Samuel Gomes Brandão, Wilmington, DE (US); Guilherme Marques Peçanha Araújo, Wilmington, DE (US); Emily Zhang, Wilmington, DE (US)

(73) Assignee: OYSTER HR, Inc., Wilmington, DE (US)

(*) Notice: Subject to any disclaimer, the term of this patent is extended or adjusted under 35 U.S.C. 154(b) by 236 days.

(21) Appl. No.: 18/177,014

(22) Filed: Mar. 1, 2023

(65) Prior Publication Data
US 2024/0296424 A1 Sep. 5, 2024

(51) Int. Cl.
*G06Q 10/1053* (2023.01)
(52) U.S. Cl.
CPC ............... *G06Q 10/1053* (2013.01)

(58) Field of Classification Search
CPC .............. G06F 16/908; G06Q 10/1053
See application file for complete search history.

(56) References Cited

U.S. PATENT DOCUMENTS

| | | | |
|---|---|---|---|
| 2008/0072334 A1* | 3/2008 | Bailey | G06Q 10/10 726/28 |
| 2010/0017607 A1* | 1/2010 | Shkolnikov | H04L 51/48 713/168 |
| 2022/0122075 A1* | 4/2022 | Bardouille | G06Q 20/405 |
| 2022/0286482 A1* | 9/2022 | Barday | H04L 51/18 |
| 2023/0013012 A1* | 1/2023 | Bond | G06Q 30/018 |
| 2023/0059606 A1* | 2/2023 | Lee | G06F 3/0483 |
| 2024/0013927 A1* | 1/2024 | Lifshotz | G06Q 50/265 |

* cited by examiner

Primary Examiner — Tarek Chbouki
(74) Attorney, Agent, or Firm — DLA Piper LLP US

(57) ABSTRACT

A processor can aggregate a finite set of mutable template options, generate a mutable template and a mutable template workflow, and cause presentation of a user interface configured to receive one or more data entries into the mutable template. Responsive to the data entries, the processor can map the entries to a set of finite mutable template options associated therewith and adaptively modify the mutable template to include the specific set of finite mutable template options. The processor can modify presentation of the user interface to include the specific set of finite mutable template options, receive second input indicative of a compliance option through the user interface in response to the modifying, adaptively modify the mutable template to include rule-based data associated with the compliance option, and modify the presentation of the user interface to include the rule-based data associated with the compliance option.

20 Claims, 12 Drawing Sheets

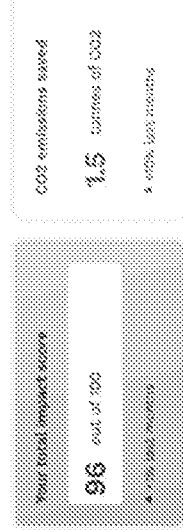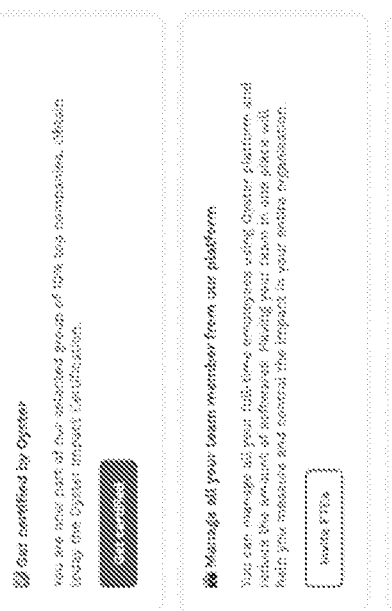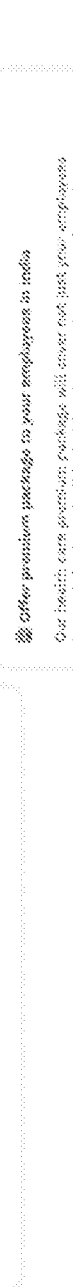
FIG. 11

SYSTEMS AND METHODS FOR DYNAMIC KNOWLEDGE DRIVEN PROCESSES

BACKGROUND

An applicant tracking system is a software application designed to facilitate the electronic management of recruitment and hiring requirements. Such software enables companies to structure and customize their hiring into an efficient and scalable process and to attract, source, evaluate, and hire candidates better and faster.

However, while the primary goal of an applicant tracking system is to simplify the employee recruitment and onboarding process, conventional applicant tracking systems suffer from several drawbacks and limitations. For example, since most conventional applicant tracking systems are hard coded (i.e., rigidly programmed with code that requires recoding for every change), such that they fail to adapt to the necessary level of customization needed to create hiring documents that are tailored to the specific needs of a particular organization or job role as they evolve over time. This can result in inadequate hiring templates being generated that are not effective at accurately capturing or providing a candidate with the necessary onboarding information. In addition, conventional applicant tracking systems' inability to be easily modified once programmed can further lead to inconsistent data integration across hiring processes as candidates with atypical hiring needs are onboarded with a company.

Further still, companies must adhere to employment and data privacy laws and regulations where they employ and hire personnel. Conventional applicant tracking systems rely on rigid storage mechanisms, such as documents, disparately stored files, and data stored in rigid database structures that are not able to adapt to the variety of cases of regulatory compliance on a global scale data. However, such storage techniques for maintaining commonly accessed and ever-evolving information are inadequate, as they often require hard coded programs to maintain said information, result in inefficient use of computational resources to access/share the information, and/or require regular database reprogramming to adapt to regulatory changes associated with the information. In addition, for companies that hire globally or across multiple states, such storage techniques, in aggregate, lead to technical inefficiencies that prevent applicant tracking systems from scaling, efficiently capturing important personnel information, and ensuring that companies are in compliance with local laws. Moreover, such storage techniques are only configured to store large amounts of data and lack the functionality to inherently run calculations or update data without coding.

Accordingly, there is a need for systems and methods that address the deficiencies of these conventional approaches.

SUMMARY

The instant system and methods provide improvements and solutions to the known limitations and deficiencies discussed above. The disclosed solution leverages a system comprising a dynamic dashboard in communication with a hybrid database to enable knowledge driven processes. The instant solution improves upon conventional applicant tracking systems by enabling the generation of customizable and cloud-based mutable templates that adapt to input in real-time. The ability to generate customizable mutable templates in real-time can enable companies that engage in multijurisdictional hiring to tailor their onboarding process to the geographic location, regulatory requirements, and informational needs of the position being hired for.

In one respect, the dynamic dashboard may enable the company to generate numerous mutable templates that, in addition to collecting information, can dictate a workflow model that governs the onboarding process, and can further automatically generate forms and documents (e.g., agreements) between the company and an employee. For example, once a company generates a mutable template and makes it accessible for use, the system can intelligently adjust the workflow of a given mutable template, such that the appropriate fields, options, and instructions, that are displayed are tailored to a specific phase of the onboarding process, the specific relevant employment regulations, the requirements of the position, and the real-time input of the newly hired employee.

In another respect, the instant solution improves upon the conventional storage techniques that are used in conjunction with conventional applicant tracking systems by implementing a hybrid database system that enables the real-time updating and multi-node synchronization of database objects via the mutable templates. For example, as a company generates a mutable template, the system can create the necessary properties, permissions, workflows, tabs, tables, rows and columns, to store the information received in the input fields of the mutable templates and import various database object types. Further, the dynamic dashboard is configured to visually present data, modify data, enable a company to assign attributes to information, and relationally search the hybrid database system for stored information without the company entering database commands.

The instant solution also improves upon the functionality of conventional applicant tracking system storage techniques by enabling companies to derive intelligent insights from stored information, such that the system can employ mapping techniques to infer relationships between data and calculate compliance scores.

In one embodiment, a system is configured to implement a method comprising: receiving a request to generate a mutable template; querying a server to aggregate a finite set of mutable template options in response to receiving the request; generating the mutable template and a corresponding mutable template workflow including one or more paths; receiving input indicative of a username on the mutable template, wherein the username is associated with a geographic location; mapping the username and the geographic location to a specific set of finite mutable template options associated with the username and the geographic location; refining the finite set of mutable template options to the specific set of finite mutable template options; adaptively modifying the mutable template to include the specific set of finite mutable template options and limiting the mutable template workflow to the one or more paths associated with the specific set of finite mutable template options; receiving second input indicative of a compliance option, wherein the compliance option is one of the specific set of finite mutable options; and adaptively modifying the mutable template to include rule-based data associated with the compliance option.

Although, the embodiment above is directed to a system, it should be appreciated that the instant solution may additionally be directed to computer-implemented methods, and non-transitory computer readable mediums configured to implement and store similar instructions.

BRIEF DESCRIPTION OF THE FIGURES

FIG. 11 depicts an exemplary dashboard showing intelligent insights according to an embodiment of the present disclosure.

DETAILED DESCRIPTION OF SEVERAL EMBODIMENTS

Figure 1:
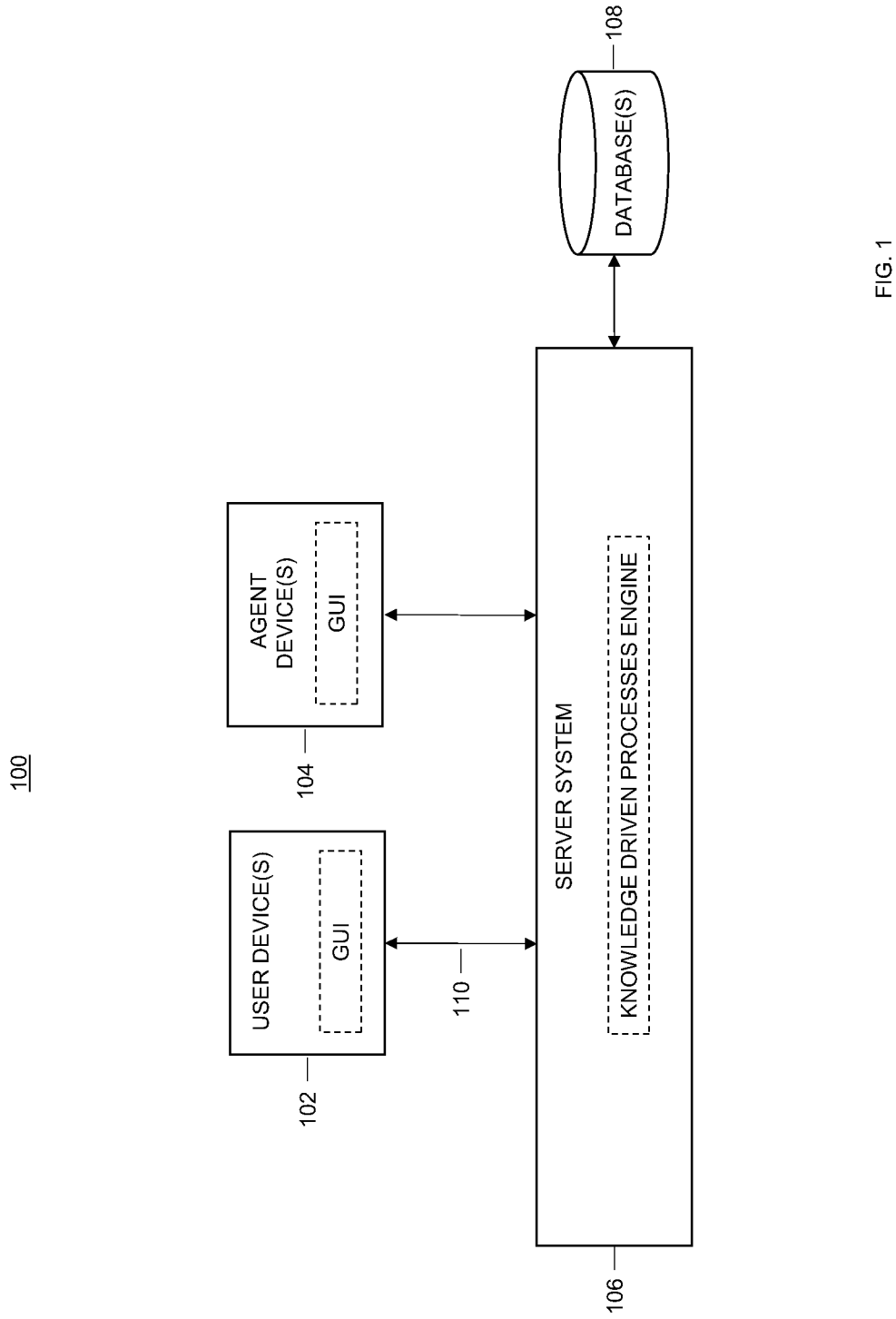
FIG. 1 depicts an exemplary system configured to implement dynamic knowledge driven processes according to an embodiment of the present disclosure.

Referring to FIG. 1, computing environment 100 can be configured to implement dynamic knowledge driven processes, according to embodiments of the present disclosure. Computing environment 100 may include one or more user device(s) 102, one or more agent device(s) 104, a server system 106, and one or more database(s) 108, communicatively coupled to the server system 106. The user device(s) 102, agent device(s) 104, server system 106, and database(s) 108 may be configured to communicate through network 110.

In one or more embodiments, user device(s) 102 is operated by a user. Users may include, but are not limited to, individuals such as, individuals, companies, prospective clients, customers, or new hire employees of customers of an entity associated with server system 106, such as companies utilizing the services of, or consultation from, an entity associated with that document and server system 106.

User device(s) 102 according to the present disclosure may include, without limit, any combination of mobile phones, smart phones, tablet computers, laptop computers, desktop computers, server computers or any other computing device configured to capture, receive, store and/or disseminate any suitable data. In one embodiment, a user device(s) 102 includes a non-transitory memory, one or more processors including machine readable instructions, a communications interface which may be used to communicate with the server system (and, in some examples, with the database(s) 108), a user input interface for inputting data and/or information to the user device and/or a user display interface for presenting data and/or information on the user device. In some embodiments, the user input interface and the user display interface are configured as an interactive graphical user interface (GUI). The user device(s) 102 are also configured to provide the server system 106, via the interactive GUI, input information such as user actions (e.g., queries, media, text, and/or documents) for further processing. In some embodiments, the interactive GUI is hosted by the server system 106 or provided via a client application operating on the user device. In some embodiments, a user operating the user device(s) 102 may query server system 106 for information related to a service provided by an entity hosting server system 106.

In one or more embodiments, each agent device(s) 104 is operated by a user under the supervision of the entity hosting and/or managing server system 106. Agent device(s) 104 may be representative of a mobile device, a tablet, a desktop computer, or any computing system having the capabilities described herein. Users of the agent device(s) 104 include, but are not limited to, individuals such as, for example, software engineers, database administrators, employees, and/or customer service agents, of an entity associated with server system 106.

Agent device(s) 104 according to the present disclosure include, without limit, any combination of mobile phones, smart phones, tablet computers, laptop computers, desktop computers, server computers or any other computing device configured to capture, receive, store and/or disseminate any suitable data. In one embodiment, each agent device(s) 104 includes a non-transitory memory, one or more processors including machine readable instructions, a communications interface that may be used to communicate with the server system (and, in some examples, with database(s) 108), a user input interface for inputting data and/or information to the user device and/or a user display interface for presenting data and/or information on the user device. In some examples, the user input interface and the user display interface are configured as an interactive GUI. The agent device(s) 104 are also configured to provide the server system 106, via the interactive GUI, input information (e.g., queries) for further processing. In some examples, the interactive GUI may be hosted by the server system 106 or it may be provided via a client application operating on the user device.

The server system 106 includes one or more processors, servers, databases, communication/traffic routers, non-transitory memory, modules, and interface components. In one or more embodiments, server system 106 hosts, stores, and operates a dynamic dashboard to implement knowledge driven processes. Server system 106 may be configured to receive a request to generate a mutable template and in response query to aggregate a finite set of mutable form options in response to receiving the request. Server system 106 may be further configured to generate the mutable template and a corresponding mutable template workflow including one or more paths. Server system 106 may further receive input indicative of a username on the mutable form, wherein the username is associated with a geographic location and map the username and geographic location to a specific set of finite mutable form options associated with the username and the geographic location. Server system 106 may then refine the finite set of mutable form options to the specific set of finite mutable form options and adaptively modifying the mutable form to include the specific set of finite mutable form options and limiting the mutable form workflow to one or more paths associated with the specific set of finite mutable form options. Server system 106 may subsequently receive input indicative of a compliance option, wherein the compliance option is one of the specific set of finite mutable options and adaptively modifying the mutable form to include rule-based data associated with the compliance option.

Moreover, the server system 106 may include security components capable of monitoring user rights and privileges associated with initiating API requests for accessing the server system 106 and modifying data in database(s) 108. Accordingly, the server system 106 may be configured to manage user rights, manage access permissions, object permissions, and the like. The server system 106 may be further configured to implement two-factor authentication, secure sockets layer (SSL) protocols for encrypted communication sessions, biometric authentication, and token-based authentication.

Database(s) 108 may be locally managed, and/or may be a cloud-based collection of organized data stored across one or more storage devices. Database(s) 108 may be complex and developed using one or more design schema and modeling techniques. Database(s) 108 may be hosted at one or more data centers operated by a cloud computing service provider. Database(s) 108 may be geographically proximal to or remote from the server system 106 and is configured for data dictionary management, data storage management, multi-user access control, data integrity, backup and recovery management, database access language application programming interface (API) management, and the like. Database(s) 108 is in communication with server system 106, end user device(s) 102, and agent device(s) 104, via network 110. Database(s) 108 stores various data, including workflow and employment data that can be modified and leveraged by server system 106 and agent device(s) 104. Various data in the database(s) 108 will be refined over time using a dynamic dashboard. In conjunction with the dynamic dashboard and/or other computer environment 100 components, database(s) 108 may enable hybrid database functionality as discussed in relation to FIG. 3. Additionally, database(s) 108 may be deployed and maintained automatically by one or more components shown in FIG. 1.

Network 110 may be of any suitable type, including individual connections via the Internet, cellular or Wi-Fi networks. In some embodiments, network 110 may connect terminals, services, and mobile devices using direct connections, such as radio frequency identification (RFID), near-field communication (NFC), Bluetooth™, low-energy Bluetooth™ (BLE), Wi-Fi™, ZigBee™, ambient backscatter communication (ABC) protocols, USB, WAN, LAN, or the Internet. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

In some embodiments, communication between the elements may be facilitated by one or more application programming interfaces (APIs). APIs of server system 106 may be proprietary and/or may be examples available to those of ordinary skill in the art such as Amazon® Web Services (AWS) APIs or the like.

Figure 2:
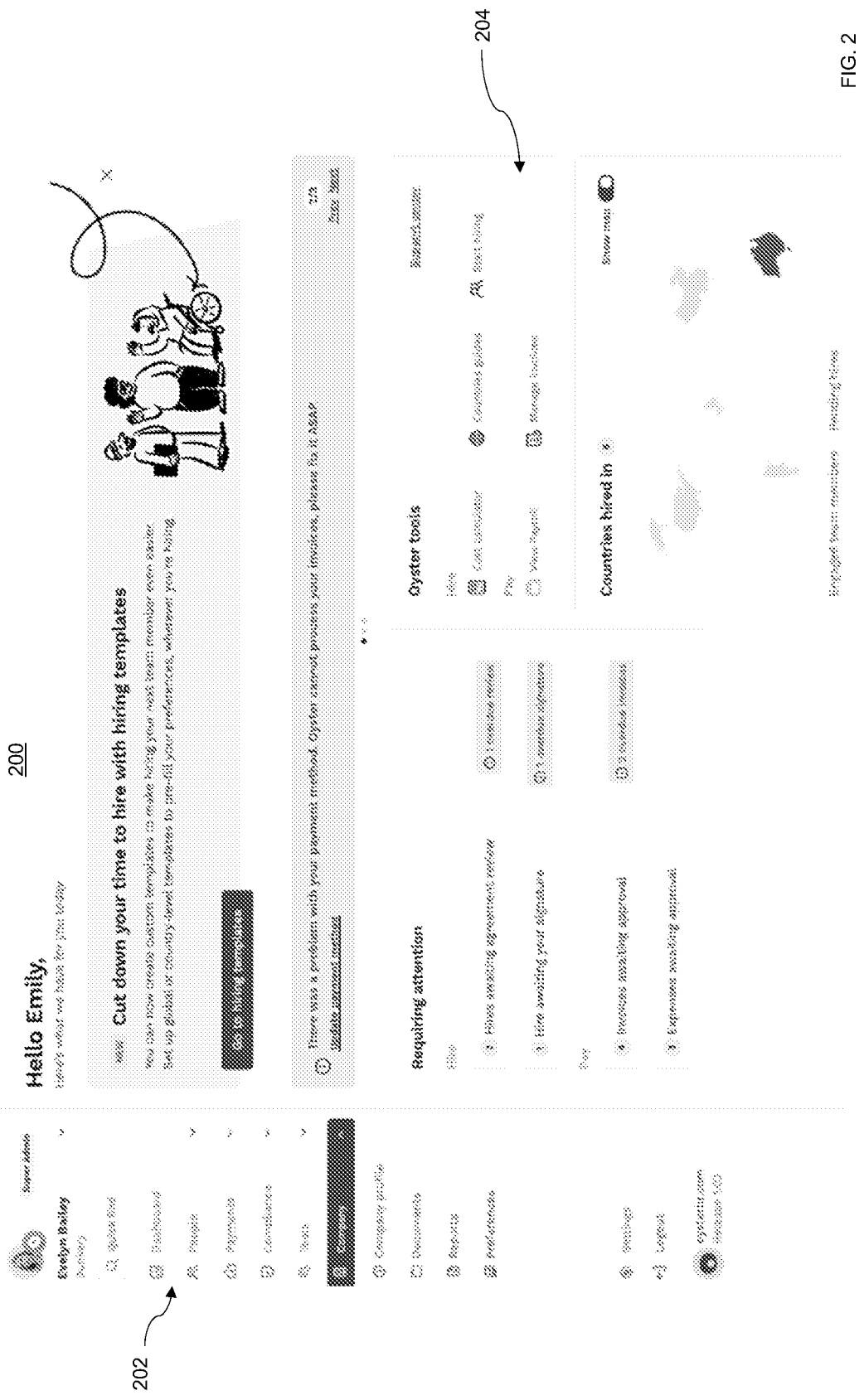
FIG. 2 depicts an exemplary dynamic dashboard according to an embodiment of the present disclosure.

FIG. 2 depicts an exemplary dynamic dashboard 200 according to an embodiment of the present disclosure. In one embodiment, dynamic dashboard 200 may enable the implementation of various global employment tasks initiated by users operating user device(s) 102. For example, dynamic dashboard 200 may enable companies to implement employee onboarding and offboarding processes, initiate communication via communication portals, implement payroll processes, approve expense reimbursement, manage benefits packages, and manage multijurisdictional regulatory compliance.

Dynamic dashboard 200 may be managed, hosted, and a product/service provided by an entity associated with server system 106. As depicted, dynamic dashboard 200 may be an interface that includes features such as a dynamic dashboard menu 202 and dynamic dashboard tools 204. Dynamic dashboard 200 may additionally provide status updates regarding pending projects and further provide graphs for visualizing data.

As previously discussed, dynamic dashboard 200 may be in communication with database(s) 108, such that as a collective computing environment hosts a hybrid database system configured to store, manipulate, and import various data without requiring users of user device(s) 102 to write code. Further, dynamic dashboard 200 may enable the visualization of data, the generation of mutable templates, forms, and documents, and the mapping of disparate data such that unknown relationships can be inferred.

Figure 3:
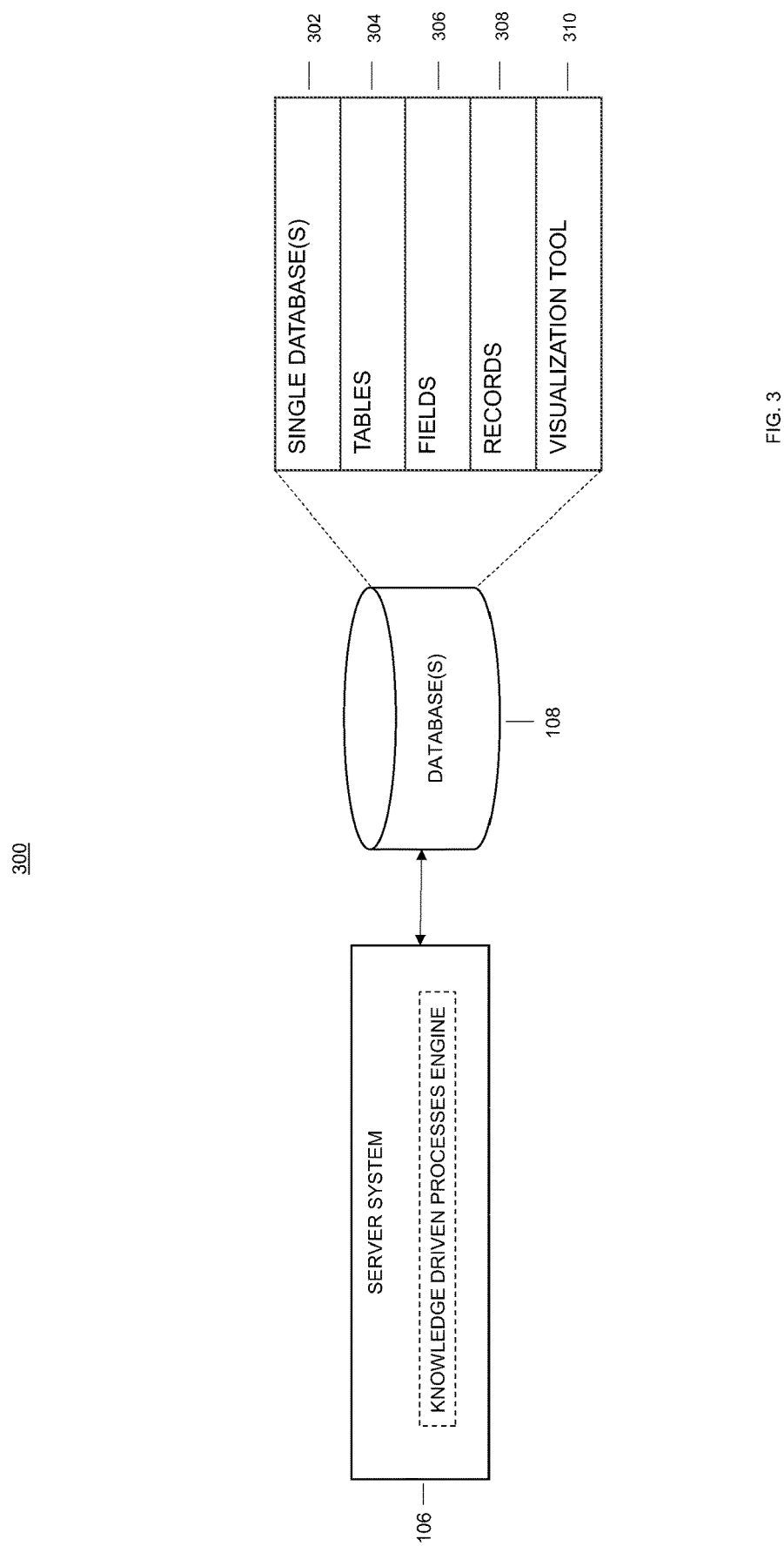
FIG. 3 depicts an exemplary block diagram of hybrid database system according to an embodiment of the present disclosure.

FIG. 3 depicts an exemplary block diagram of a hybrid database system 300 according to an embodiment of the present disclosure. As depicted, database(s) 108 may store various data, including single databases 302, tables 304, fields 306, records 308, and visualization tool 310.

Single databases 302 may include all the data that is required to implement a specific project. It may additionally include various libraries of mutable templates including pre-populated mutable templates. For data security purposes single databases 302 may have access permissions that only permit users with the requisite credentials to access it. In one example, a company operating user device(s) 102 may initiate a process to generate a new hire mutable template. In response, server system 106 may automatically create single databases 302 to store data associated with the new hire mutable template.

Tables 304 may be a table within single databases 302. Tables 304 may be configured to store various data in a structured format, for example a list, with related data across one or more rows and columns. Notably, one or more tables 304 may be created and stored within single databases 302 and may enable spreadsheet-like functionality that further enables stored data to be analyzed to perform calculations, sorting, filtering, and the like. In one example, tables 304 may store new hire demographic data that is aggregated as user input demographic data into mutable templates.

Fields 306 are the equivalent to columns in a spreadsheet and are used to maintain consistency amongst stored data. Each fields 306 typically has a distinct name and can be manipulated to hold several types of data, such as images, documents, telephone numbers, dates, checkboxes, and the like. For example, fields 306 may be a column of names of newly hired employees.

Records 308 are the equivalent of rows in a spreadsheet and are used to hold data related to items across multiple fields 306. For example, records 308 in a tables 304 related to newly hired employees, the name of an employee, wherein each individual holds the name of a different newly hired employee.

Visualization tool 310 enables the tables 304 and/or their corresponding fields 306 and records 308 to be viewed from a perspective different than the spreadsheet-like format they may be stored in. For example, data in fields 306 related to the geographic location where newly hired employees can be filtered and viewed in map form with each country held in fields 306 being highlighted.

In aggregate, the combination of the database(s) 108, single databases 302, tables 304, fields 306, records 308, and visualization tool 310, and dynamic dashboard 200, form hybrid database system 300 with the functionality discussed above. Further, as should be understood from the immediate examples, data inputted into dynamic dashboard 200, and in particular mutable templates, may populate the data held single databases 302, tables 304, fields 306, records 308, and visualization tool 310, discussed above without users (e.g., operating user device(s) 102) having to use code or database commands.

Figure 4:
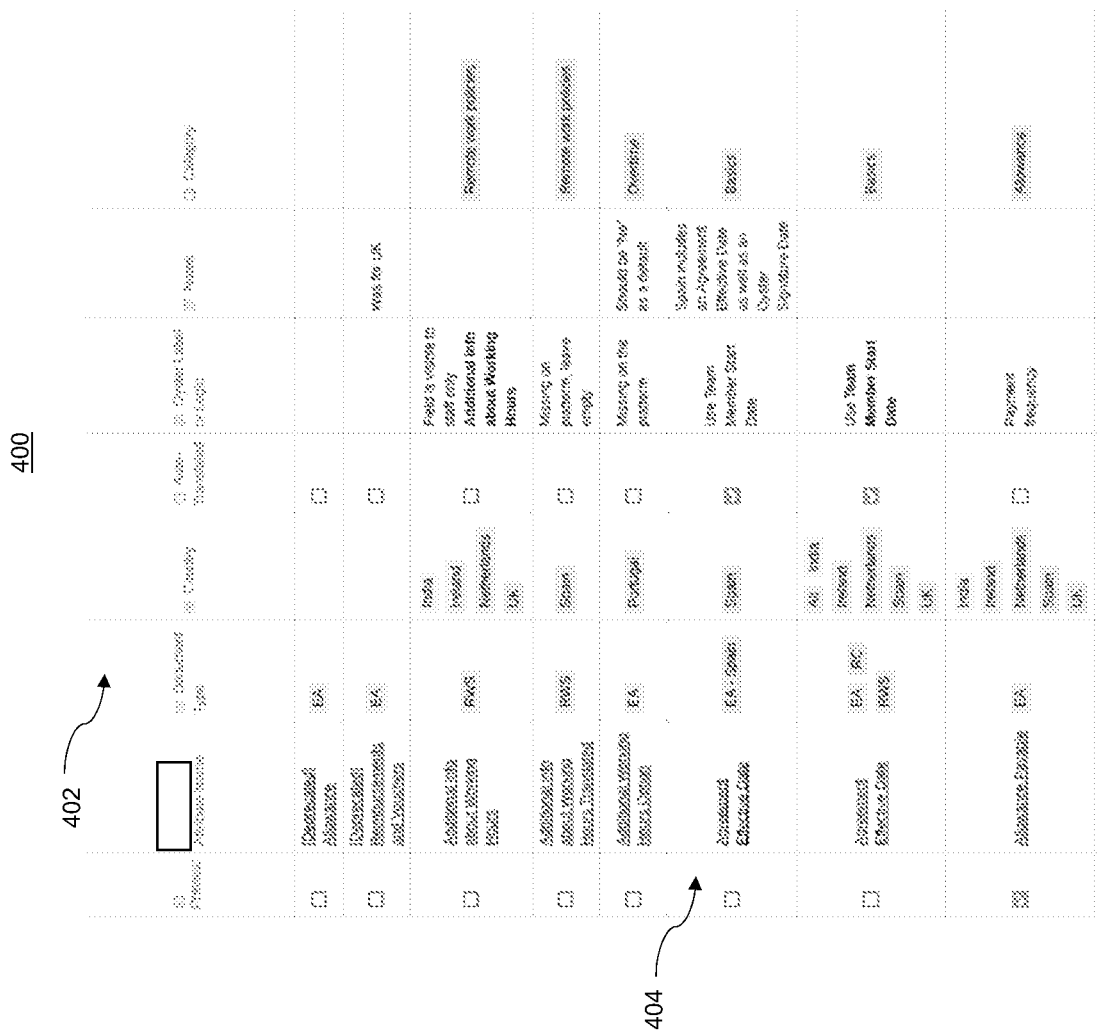
FIG. 4 depicts an exemplary mapping structure according to an embodiment of the present disclosure.

FIG. 4 depicts an exemplary document mapping structure 400 according to an embodiment of the present disclosure. In some embodiments, mutable templates may have corresponding workflows that have phases that require the generation of documents (e.g., agreements) that must be executed in furtherance of onboarding, offboarding, or maintaining the employment of an employee. For example, document mapping structure 400 during an initial onboarding phase associated with a mutable template, an employment agreement may be generated. Here, server system 106 may reference the requirements of the given mutable template and the unique characteristics of the employee (e.g., hiring geographic location) against the document type 402, country, and attributes 404 name in the document mapping structure to ensure that the appropriate agreement is generated. Such mapping techniques enable automation, reduce computational, and increases hiring workflow consistency.

Figure 5:
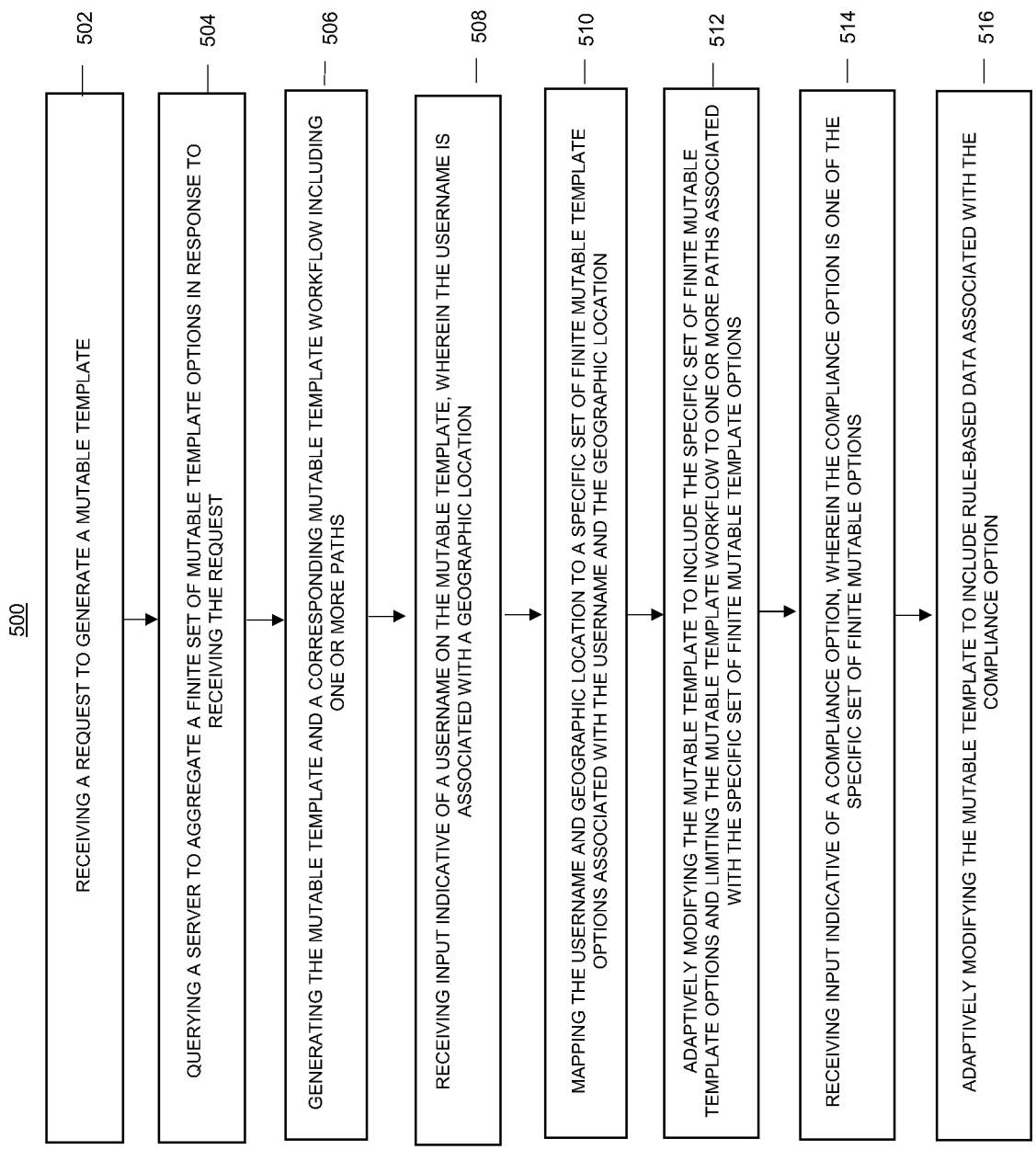
FIG. 5 depicts an exemplary method for generating a mutable template according to an embodiment of the present disclosure.

FIG. 5 depicts an exemplary method 500 for generating a mutable template according to an embodiment of the present disclosure. Mutable templates may be generated in furtherance in one or more employment related processes.

At 502, server system 106 may receive a request to generate a mutable template. For example, a user operating user device(s) 102 may submit a request via dynamic dashboard 200 to generate a mutable template related to a human resource process.

At 504, server system 106 may generate a query to aggregate a finite set of mutable template options in response to receiving the request. For example, in furtherance of generating a mutable template, server system 106 may narrow the list of possible mutable template options, such as drop-down menu options, benefits that comply with specific geographic employment regulations, input fields to receive employee payroll data, and the like.

At 506, server system 106 may generate the mutable form and a corresponding mutable template workflow including one or more paths. Here, for example, server system 106 may create the mutable template with corresponding phases that are presented in such an order that make a user's traversal of the mutable template trackable. Said order of phases, is equivalent to a predetermined workflow that require that certain prompts be presented in a certain order. In addition, a given workflow may include multiple paths that may be taken, depending on the input provided by the user. Selecting one path over another may cause the mutable form to dynamically modify in real-time, such that some mutable form options appear, others may become removed or hidden, and workflow paths limited to relevant subsequent phases.

At 508, server system 106 may receive an input indicative of a username on the mutable template, wherein the username is associated with a geographic location. For example, a user operating user device(s) 102 select a user identifier associated with a newly hired employee to initiate an onboarding process for the employee. As discussed in relation to FIG. 3, project related data may be stored in database(s) 108 tables 304, such that by selecting the user identifier the employee's associated geographic location is also known.

At 510, server system 106 may map the username and geographic location to a specific set of finite mutable form options associated with the username and the geographic location. For example, in response to receiving input indicative of the user identifier and determining the geographic location associated with the user identifier, server system 106 may leverage this input to reference a tables 304 to determine how the mutable form should be subsequently modified, as it relates to mutable template options, mutable template workflows, and the like. Server system 106 may refine the finite set of mutable form options to the specific set of finite mutable template options. Here, server system 106 may further refine the set of mutable template options by determining the necessary mutable workflow paths and options, and further by eliminating irrelevant workflow paths, hiding unnecessary mutable template options, and the like.

At 512, server system 106 may adaptively modify the mutable form to include the specific set of finite mutable template options and limit the mutable form workflow to one or more paths associated with the specific set of finite mutable form options. For example, server system 106 may further modify the mutable template and its corresponding phases, mutable workflow paths, and mutable template options, in response to the determination made at 512 in real-time.

At 514, server system 106 may receive input indicative of a compliance option, wherein the compliance option is one of the specific set of finite mutable options. Here, the server system 106 may receive input indicative of a compliance selection that will impact an employment package provided to an employee, and consequently impact the mutable template workflow and options. However, specifically here, server system 106 ensures that subsequent modification to the mutable template workflows and options comply with specific employment laws and regulations that are unique to the geographic location identified at 508. Notably, as will discussed in greater detail in relation to FIGS. 7-8, the compliance option that is selected, may have been one of several compliance options with varying levels of employment related attributes that either meet or exceed the requirements of governing employment laws associated with the geographic location identified at 508.

At 516, server system 106 may adaptively modify the mutable template to include rule-based data associated with the compliance option. For example, in response to the compliance option that was selected at 514, mutable template may be configured to be dynamically modified to display compliance related feedback associated with the compliance option. In addition, or alternatively, the mutable template may be configured to dynamically modified to include a virtual assistant into that enables additional feedback to be provided.

Figure 6:
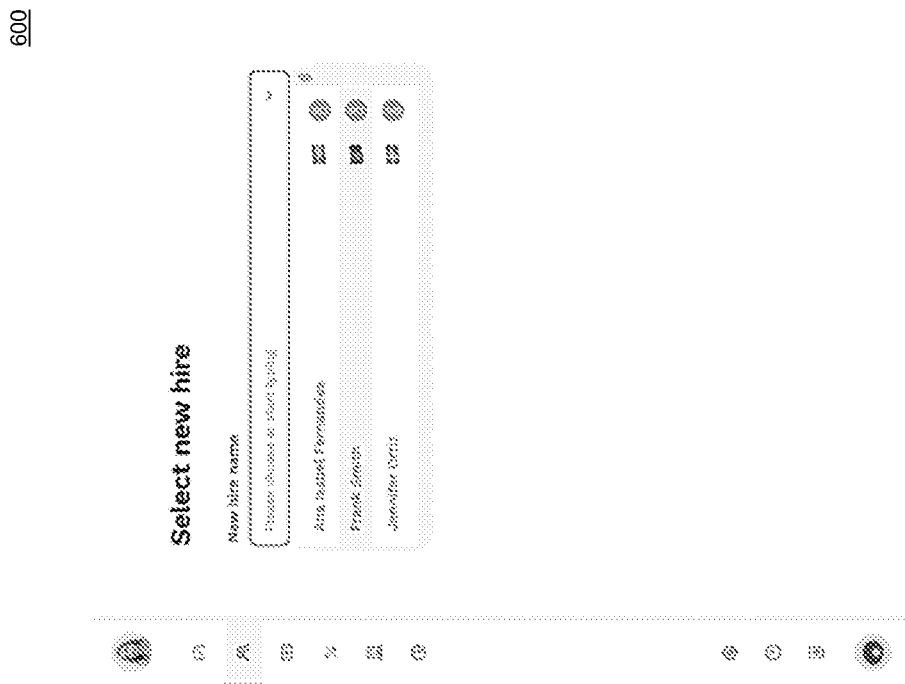
FIG. 6 depicts an exemplary new hire phase of an onboarding mutable template workflow according to an embodiment of the present disclosure.

FIG. 6 depicts an exemplary new hire phase of an onboarding mutable template workflow 600 according to an embodiment of the present disclosure. As depicted, a new hire phase associated with an onboarding mutable template may include an initial selection of a new hire name. Here, a similar method may be implemented to the one discussed in relation to 508. Modifying a mutable template to provide the new hire employees in the drop-down menu may require access hybrid database system 300 in real-time.

Figure 7:
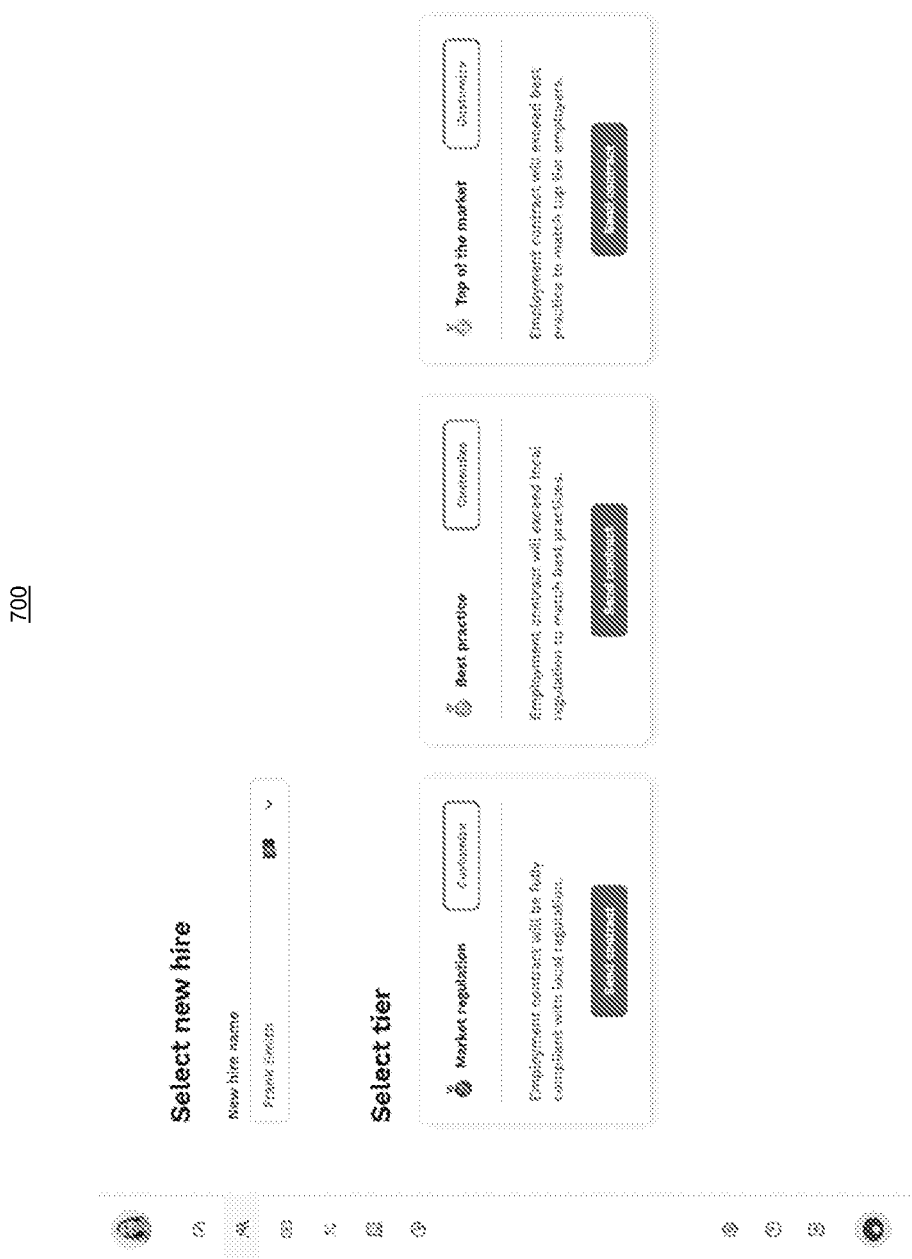
FIG. 7 depicts an exemplary compliance phase in an onboarding mutable template workflow according to an embodiment of the present disclosure.

FIG. 7 depicts an exemplary compliance phase in an onboarding mutable template workflow 700 according to an embodiment of the present disclosure. As depicted, one or more compliance tiers are made available to be selected. The compliance tiers may include options such as, a market regulation tier, best practice tier, and top of the market tier. The market regulation tier may provide an employee with an employment contract that exactly meets the local geographic region's regulatory requirements. In contrast, the best practice tier will provide an employee with an employment contract that exceeds a local geographic region's regulatory requirements that is additionally on par local cultural practices. In further contrast, the top of the market tier provides an employee with an employment contract that exceeds both the market and best practice contracts. Notably, such compliance tiers can be stored in single databases 302 and/or tables 304, such that updating the compliance options may only require modifying text in records 308. In addition, server system 106 can leverage whatever compliance options data that is held in single databases 302 and/or tables 304, such that mutable templates and document can leverage this information without coding.

Figure 8:
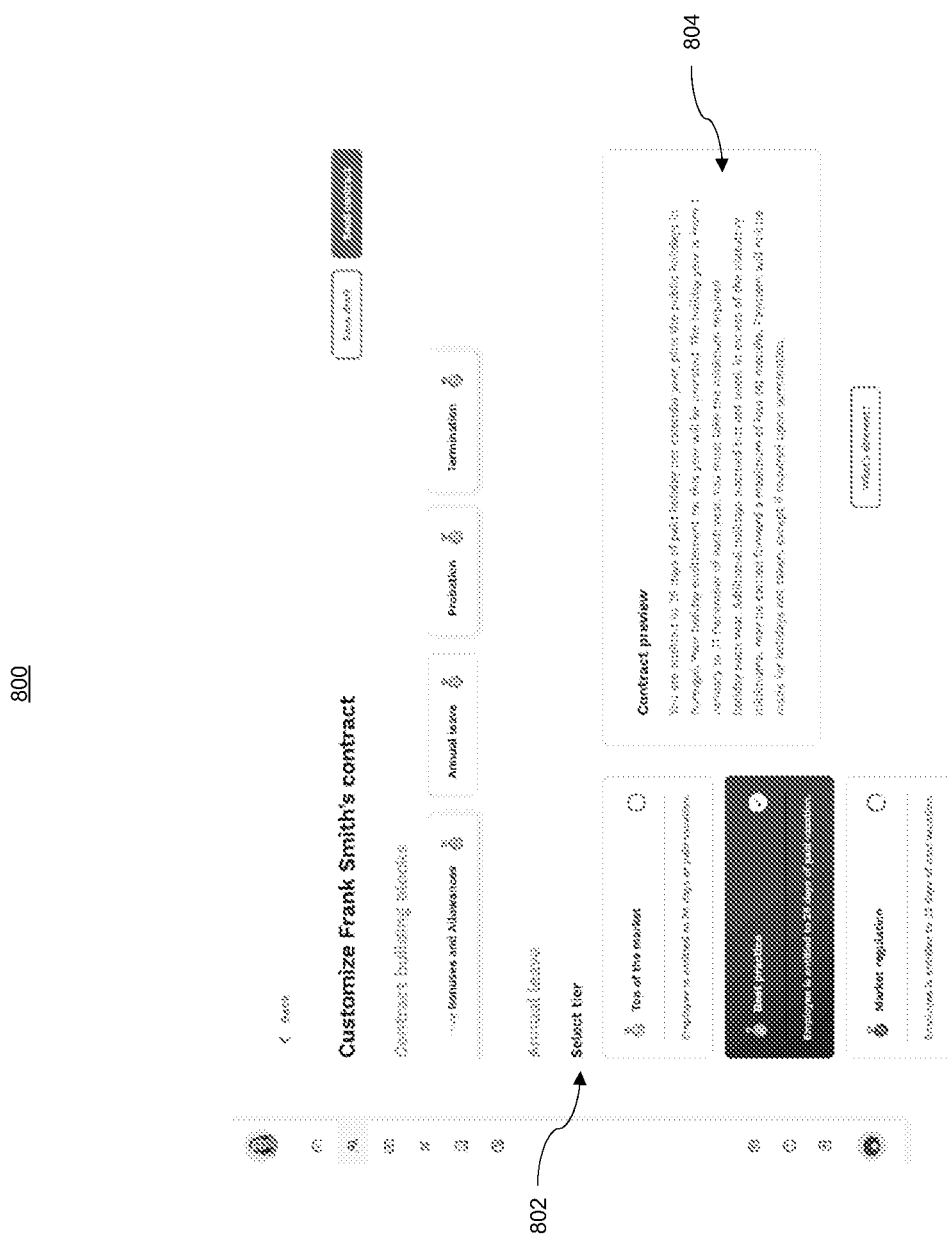
FIG. 8 depicts an exemplary compliance phase in an onboarding template workflow including guidance information according to an embodiment of the present disclosure.
Figure 9:
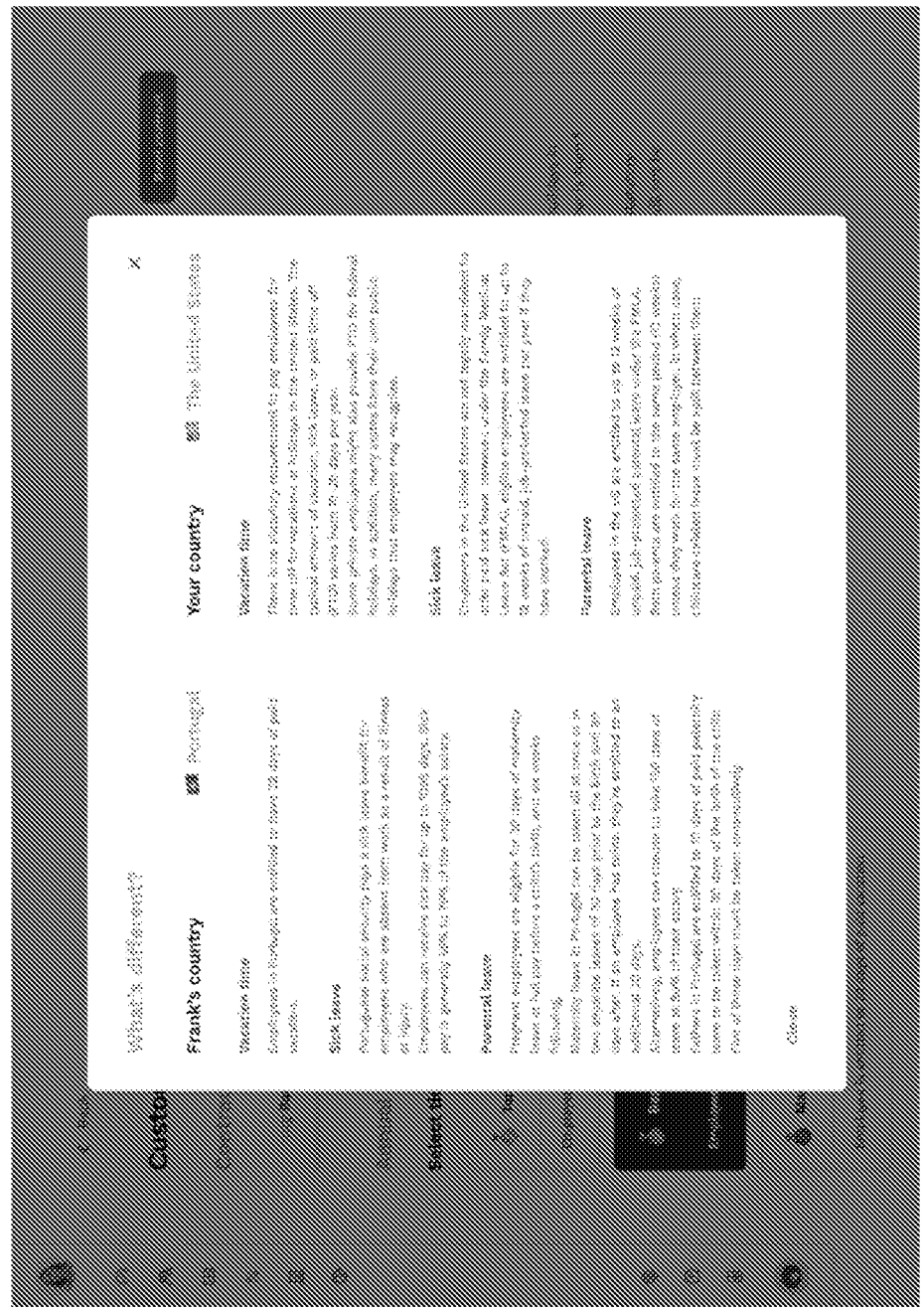
FIG. 9 depicts an exemplary compliance phase in an onboarding template workflow including comparative guidance information according to an embodiment of the present disclosure.

FIG. 8 depicts an exemplary compliance phase in an onboarding template workflow including guidance information 800 according to an embodiment of the present disclosure. As depicted, a compliance tier 802 is selected, an in response, a contract preview 804 can by dynamically displayed. To dynamically display the contract preview 804 in real-time, server system 106 can leverage whatever compliance options data that is held in single databases 302 and/or tables 304, such that mutable templates and document can leverage this information without coding. Notably, similar compliance related language will dynamically be included in a generated agreement FIG. 9 depicts an exemplary compliance phase in an onboarding template workflow 900 including comparative guidance information according to an embodiment of the present disclosure. As discussed in relation to FIG. 8, compliance guidance can be provided once a compliance tier is selected. Here, in one embodiment side-by-side comparative guidance can be dynamically populated.

Figure 10:
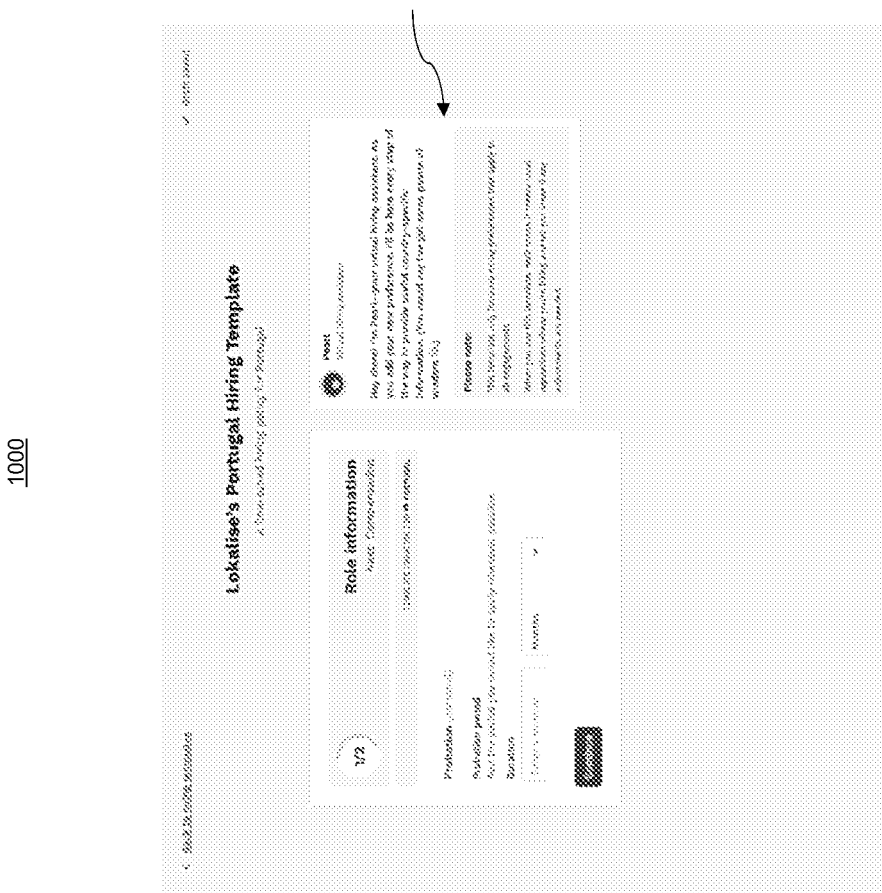
FIG. 10 depicts an exemplary virtual assistant in an onboarding template workflow according to an embodiment of the present disclosure.

FIG. 10 depicts an exemplary virtual assistant in an onboarding template workflow 1000 according to an embodiment of the present disclosure. As a mutable template is being generated, a virtual assistant may be dynamically populated to provide insight regarding the particular phase and to note how server system 106 may implement rule-based compliance checks to ensure that the mutable template is in compliance with local regulations. Notably, the virtual assistant is not limited to providing compliance information and may be further configured to provide insight along various human resource processes. In addition, in some instances, forms and documents (e.g., agreements) can be constrained and/or pre-populated in accordance with the virtual assistant.

FIG. 11 depicts an exemplary dashboard showing intelligent insights 1100 according to an embodiment of the present disclosure. As depicted, intelligent insights such total impact score, CO2 emission metrics, money invested in emerging markets, and diversity, equity, and inclusion score, can be determined and dynamically presented. Given that hybrid database system 300 is configured to enable spreadsheet-like analytics features to automatically extrapolate the aforementioned insights from disparate data held in the hybrid database system 300. Such insights may be extrapolated by mapping previously unrelated data, inferring relationships, and conducting comparative analysis all held data points.

Figure 12:
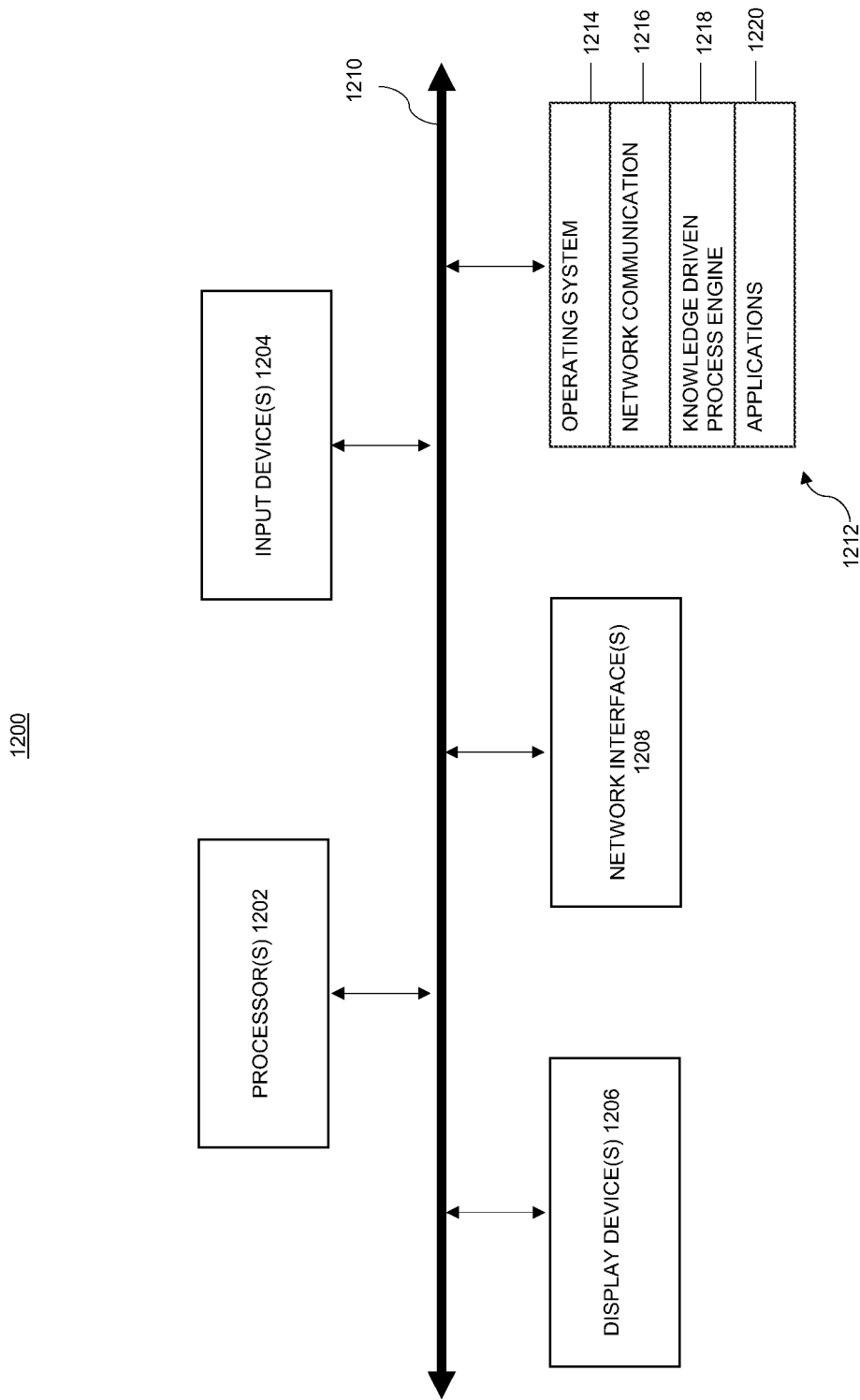
FIG. 12 depicts an exemplary computing device according to an embodiment of the present disclosure.

FIG. 12 depicts and exemplary computing device according to an embodiment of the present disclosure. For example, in some embodiments the computing device 1200 may function as the user device(s) 102, or agent device(s) 104, and/or server system 106 or a portion of any of these elements. The computing device 1200 may be implemented on any electronic device that runs software applications derived from instructions, including without limitation personal computers, servers, smart phones, media players, electronic tablets, game consoles, email devices, etc. In some implementations, the computing device 1200 may include processor(s) 1202, one or more input device(s) 1204, one or more display device 1206, one or more network interfaces 1208, and one or more computer-readable medium 1212. Each of these components may be coupled by a bus 1210.

The display device 1206 may be any known display technology, including but not limited to display devices using Liquid Crystal Display (LCD) or Light Emitting Diode (LED) technology. The processor(s) 1202 may use any known processor technology, including but not limited to graphics processors and multi-core processors. The input device(s) 1204 may be any known input device technology, including but not limited to a keyboard (including a virtual keyboard), mouse, track ball, and touch-sensitive pad or display. The bus 1210 may be any known internal or external bus technology, including but not limited to ISA, EISA, PCI, PCI Express, USB, Serial ATA, or FireWire. The computer-readable medium 1212 may be any non-transitory medium that participates in providing instructions to the processor(s) 1202 for execution, including without limitation, non-volatile storage media (e.g., optical disks, magnetic disks, flash drives, etc.), or volatile media (e.g., SDRAM, ROM, etc.).

The computer-readable medium 1212 may include various instructions for implementing an operating system 1214 (e.g., Mac OS®, Windows®, Linux). The operating system may be multi-user, multiprocessing, multitasking, multithreading, real-time, and the like. The operating system may perform basic tasks, including but not limited to: recognizing input from the input device(s) 1204; sending output to the display device 1206; keeping track of files and directories on the computer-readable medium 1212; controlling peripheral devices (e.g., disk drives, printers, etc.) which can be controlled directly or through an I/O controller; and managing traffic on the bus 1210. The network communications instructions 1216 may establish and maintain network connections (e.g., software for implementing communication protocols, such as TCP/IP, HTTP, Ethernet, telephony, etc.).

The knowledge driven process engine 1218 may include instructions that enable computing device 1200 to implement one or more methods as described herein. Applications 1220 may be an application that uses or implements the processes described herein and/or other processes. The processes may also be implemented in the operating system 1214. For example, applications 1220 and/or operating system 1214 may execute one or more operations to implement knowledge driven processes.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java, python, and the like), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random-access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112 (f). Claims that do not expressly include the phrase "means for" or "step for" are not to be interpreted under 35 U.S.C. 112 (f).

What is claimed is:

1. A system comprising:
   at least one processor; and
   at least one non-transitory computer-readable medium storing instructions that, when executed by the at least one processor, cause the at least one processor to perform processing comprising:
   receiving a request to generate a mutable template;
   aggregating a finite set of mutable template options in response to receiving the request;
   generating the mutable template and a corresponding mutable template workflow including one or more paths;
   causing presentation of a user interface configured to receive one or more data entries into the mutable template;
   receiving input indicative of a username on the mutable template through the user interface, wherein the username is associated with a geographic location;
   mapping the username and the geographic location to a specific set of finite mutable template options associated with the username and the geographic location;
   refining the finite set of mutable template options to the specific set of finite mutable template options;
   adaptively modifying the mutable template to include the specific set of finite mutable template options and limiting the mutable template workflow to the one or more paths associated with the specific set of finite mutable template options;
   modifying the presentation of the user interface to include the specific set of finite mutable template options;
   receiving second input indicative of a compliance option through the user interface in response to the modifying, wherein the compliance option is one of the specific set of finite mutable options and is in compliance with at least one characteristic of the geographic location;

adaptively modifying the mutable template to include rule-based data associated with the compliance option; and modifying the presentation of the user interface to include the rule-based data associated with the compliance option.

2. The system of claim 1, wherein querying the server to aggregate the finite set of mutable template options, further comprises identifying known mutable template options that are unique to the mutable template.

3. The system of claim 1, wherein the username and geographic record are held in a record within a table.

4. The system of claim 1, wherein refining the finite set of mutable template options further includes one or more of automatically: eliminating mutable template options or hiding the mutable template options.

5. The system of claim 1, further comprising mapping disparate data associated with the username to identify previously unknown relationships between a record associated with the username and other records within a table.

6. The system of claim 1, wherein mutable template related information is stored in a single database associated with a hybrid database system.

7. The system of claim 1, wherein adaptively modifying the mutable template to include the rule-based data associated with the compliance option further comprises dynamically modifying the mutable template to include a virtual assistant that is configured to provide guidance including at least one compliance check associated with the geographic location.

8. A computer-implemented method comprising:

receiving, by at least one processor, a request to generate a mutable template;

aggregating, by the at least one processor, a finite set of mutable template options in response to receiving the request;

generating, by the at least one processor, the mutable template and a corresponding mutable template workflow including one or more paths;

causing, by the at least one processor, presentation of a user interface configured to receive one or more data entries into the mutable template;

receiving, by the at least one processor, input indicative of a username on the mutable template through the user interface, wherein the username is associated with a geographic location;

mapping, by the at least one processor, the username and the geographic location to a specific set of finite mutable template options associated with the username and the geographic location;

refining, by the at least one processor, the finite set of mutable template options to the specific set of finite mutable template options;

adaptively modifying, by the at least one processor, the mutable template to include the specific set of finite mutable template options and limiting the mutable template workflow to the one or more paths associated with the specific set of finite mutable template options;

modifying, by the at least one processor, the presentation of the user interface to include the specific set of finite mutable template options;

receiving, by the at least one processor, second input indicative of a compliance option through the user interface in response to the modifying, wherein the compliance option is one of the specific set of finite mutable options and is in compliance with at least one characteristic of the geographic location;

adaptively modifying, by the at least one processor, the mutable template to include rule-based data associated with the compliance option; and modifying, by the at least one processor, the presentation of the user interface to include the rule-based data associated with the compliance option.

9. The computer-implemented method of claim 8, wherein querying the server to aggregate the finite set of mutable template options, further comprises identifying known mutable template options that are unique to the mutable template.

10. The computer-implemented method of claim 8, wherein the username and geographic record are held in a record within a table.

11. The computer-implemented method of claim 8, wherein refining the finite set of mutable template options further includes one or more of automatically: eliminating mutable template options or hiding the mutable template options.

12. The computer-implemented method of claim 8, further comprising mapping, by the at least one processor, disparate data associated with the username to identify previously unknown relationships between a record associated with the username and other records within a table.

13. The computer-implemented method of claim 8, wherein mutable template related information is stored in a single database associated with a hybrid database system.

14. The computer-implemented method of claim 8, wherein adaptively modifying the mutable template to include rule-based data associated with the compliance option further comprises dynamically modifying the mutable template to include a virtual assistant that is configured to provide guidance including at least one compliance check associated with the geographic location.

15. A non-transitory computer-readable medium storing instructions that when executed by one or more processors cause the one or more processors to perform processing comprising:

receiving a request to generate a mutable template;

aggregating a finite set of mutable template options in response to receiving the request;

generating the mutable template and a corresponding mutable template workflow including one or more paths;

causing presentation of a user interface configured to receive one or more data entries into the mutable template;

receiving input indicative of a username on the mutable template through the user interface, wherein the username is associated with a geographic location;

mapping the username and the geographic location to a specific set of finite mutable template options associated with the username and the geographic location;

refining the finite set of mutable template options to the specific set of finite mutable template options;

adaptively modifying the mutable template to include the specific set of finite mutable template options and limiting the mutable template workflow to the one or more paths associated with the specific set of finite mutable template options;

modifying the presentation of the user interface to include the specific set of finite mutable template options;

receiving second input indicative of a compliance option through the user interface in response to the modifying, wherein the compliance option is one of the specific set of finite mutable options and is in compliance with at least one characteristic of the geographic location;

adaptively modifying the mutable template to include rule-based data associated with the compliance option; and modifying the presentation of the user interface to include the rule-based data associated with the compliance option.

16. The non-transitory computer-readable medium of claim 15, wherein querying the server to aggregate the finite set of mutable template options, further comprises identifying known mutable template options that are unique to the mutable template.

17. The non-transitory computer-readable medium of claim 15, wherein the username and geographic record are held in a record within a table.

18. The non-transitory computer-readable medium of claim 15, wherein refining the finite set of mutable template options further includes one or more of automatically: eliminating mutable template options or hiding the mutable template options.

19. The non-transitory computer-readable medium of claim 15, further comprising mapping disparate data associated with the username to identify previously unknown relationships between a record associated with the username and other records within a table.

20. The non-transitory computer-readable medium of claim 15, wherein mutable template related information is stored in a single database associated with a hybrid database system.

* * * * *